United States Patent
Gale et al.

(10) Patent No.: US 7,870,442 B2
(45) Date of Patent: Jan. 11, 2011

(54) READ INTERCHANGE OPTIMIZATION

(75) Inventors: Ernest Stewart Gale, Tucson, AZ (US); Pamela Ruth Nylander-Hill, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 12/201,578

(22) Filed: Aug. 29, 2008

(65) Prior Publication Data

US 2010/0058115 A1  Mar. 4, 2010

(51) Int. Cl.
*G06F 11/00* (2006.01)
(52) U.S. Cl. ...................................................... 714/48
(58) Field of Classification Search .............. 714/2–6, 714/15, 16, 18, 25, 37–39, 42–45, 47–49, 714/54
See application file for complete search history.

(56) References Cited

U.S. PATENT DOCUMENTS

| 7,114,104 B1 * | 9/2006 | Bennett ......................... 714/38 |
| 2005/0041316 A1 * | 2/2005 | Kato et al. ...................... 360/39 |
| 2010/0007978 A1 * | 1/2010 | Fry et al. ........................ 360/31 |
| 2010/0033861 A1 * | 2/2010 | Fry et al. ........................ 360/31 |

* cited by examiner

*Primary Examiner*—Nadeem Iqbal
(74) *Attorney, Agent, or Firm*—Zilka-Kotab, PC (57) ABSTRACT

A method in one embodiment includes detecting an identifier of a drive that has written data to a data storage medium; performing a data transfer operation to read the data from the data storage medium; monitoring the data transfer operation for detecting temporary errors; determining whether an error burst has occurred based on the monitoring; and if an error burst has occurred, altering a condition of the data transfer operation, the alteration being selected based on the identifier of the drive that wrote the data to the data storage medium. Additional methods and systems are also disclosed.

20 Claims, 9 Drawing Sheets

...READ MODE...

| Calib_selection | Enbl? | VelCK? | Sdiag Disable? | Fmt/Cart Disable? | OUTBOUND | |
|---|---|---|---|---|---|---|
| BURSTY_CALIB_NONE | TRUE | TRUE | FALSE | 0X00000000 | Indx-0 | Not a sticky/bursty condition |
| BURSTY_CALIB_GLBCLK | TRUE | TRUE | FALSE | 0X00000000 | Indx-1 | Disable Global Clock |
| BURSTY_CALIB_PLL | TRUE | TRUE | FALSE | 0X00000000 | Indx-2 | Chance clock settings |
| BURSTY_CALIB_SS | TRUE | TRUE | FALSE | 0X00000000 | Indx-3 | Saved Set Restore |
| BURSTY_CALIB_VPD | TRUE | TRUE | FALSE | 0X00000000 | Indx-4 | VPD Restore |
| BURSTY_CALIB_ERASE | FALSE | TRUE | FALSE | 0X00000000 | Indx-5 | Erase |
| BURSTY_CALIB_DSSRUN | TRUE | TRUE | FALSE | 0X00000000 | Indx-6 | DSS Restore |
| BURSTY_CALIB_SPD2 | TRUE | FALSE | FALSE | 0X00000000 | Indx-7 | Speed Change to 2 |
| BURSTY_CALIB_DSS2 | TRUE | FALSE | FALSE | 0X00000000 | Indx-8 | DSS Restore at Speed2 |
| BURSTY_CALIB_SPD4 | TRUE | FALSE | FALSE | 0X00000000 | Indx-9 | Speed Change to 4 |
| BURSTY_CALIB_DSS4 | TRUE | FALSE | FALSE | 0X00000000 | Indx-10 | DSS Restore at Speed4 |
| BURSTY_CALIB_DSSDONE | TRUE | FALSE | FALSE | 0X00000000 | Indx-11 | DSS Restore at ErrSpd |
| BURSTY_CALIB_IFC | TRUE | FALSE | FALSE | 0X00000000 | Indx-12 | IFC |

| Calib_selection | Enbl? | VelCk? | Sdiag Disable? | Fmt/Cart Disable? | OUTBOUND |
|---|---|---|---|---|---|
| BURSTY_CALIB_NONE | TRUE | FALSE | FALSE | 0X00000000 | Indx-0 Not a sticky/bursty condition |
| BURSTY_CALIB_GLBCLK | FALSE | FALSE | FALSE | 0X00000000 | Indx-1 Disable Global Clock |
| BURSTY_CALIB_PLL | FALSE | FALSE | FALSE | 0X00000000 | Indx-2 Chance clock settings |
| BURSTY_CALIB_SS | TRUE | FALSE | FALSE | 0X00000000 | Indx-3 Saved Set Restore |
| BURSTY_CALIB_VPD | TRUE | FALSE | FALSE | 0X00000000 | Indx-4 VPD Restore |
| BURSTY_CALIB_ERASE | FALSE | FALSE | FALSE | 0X00000000 | Indx-5 Erase |
| BURSTY_CALIB_DSSRUN | TRUE | FALSE | FALSE | 0X00000000 | Indx-6 DSS Restore |
| BURSTY_CALIB_SPD2 | TRUE | FALSE | FALSE | 0X00000000 | Indx-7 Speed Change to 2 |
| BURSTY_CALIB_DSS2 | FALSE | FALSE | FALSE | 0X00000000 | Indx-8 DSS Restore at Speed2 |
| BURSTY_CALIB_SPD4 | TRUE | FALSE | FALSE | 0X00000000 | Indx-9 Speed Change to 4 |
| BURSTY_CALIB_DSS4 | FALSE | FALSE | FALSE | 0X00000000 | Indx-10 DSS Restore at Speed4 |
| BURSTY_CALIB_DSSDONE | TRUE | FALSE | FALSE | 0X00000000 | Indx-11 DSS Restore at ErrSpd |
| BURSTY_CALIB_IFC | TRUE | FALSE | FALSE | 0X00000000 | Indx-12 IFC |

******************************************BURST LOG******************************************

| Wrap | ****TEMP ERROR DATA** | | | | **ROLLING DSNUM**** | |
|---|---|---|---|---|---|---|
| | Wrp | SRgn | ERgn | Hex Flag | Trig Dsnum | Indx0 Dsnum |
| [ 0] | 000 | 005 | 000 | 0000 | 00000000 | 00000000 |
| [ 1] | 000 | 000 | 008 | 0000 | 0000008a | 00000035 |
| [ 2] | 000 | 008 | 000 | 0102 | 0000008a | 00000035 |
| [ 3] | 000 | 005 | 010 | 0000 | 00000099 | 00000035 |
| [ 4] | 000 | 010 | 000 | 0103 | 00000099 | 00000035 |
| [ 5] | 000 | 000 | 012 | 0000 | 000000b1 | 00000035 |
| [ 6] | 000 | 012 | 000 | 010d | 000000b1 | 00000035 |
| [ 7] | 002 | 005 | 000 | 0000 | 00000000 | 00000000 |
| [ 8] | 002 | 000 | 009 | 0000 | 00004542 | 000044d7 |
| [ 9] | 002 | 009 | 000 | 010d | 00004542 | 000044d7 |
| [10] | 003 | 026 | 000 | 0000 | 00000000 | 00000000 |
| [11] | 004 | 005 | 000 | 0000 | 00000000 | 00000000 |
| [12] | 004 | 000 | 008 | 0000 | 00008a1d | 000089c7 |
| [13] | 004 | 008 | 000 | 010d | 00008a1d | 000089c7 |
| [14] | 006 | 005 | 000 | 0000 | 00000000 | 00000000 |
| [15] | 006 | 000 | 010 | 0000 | 0000cff6 | 0000cf6a |
| [16] | 006 | 010 | 000 | 010d | 0000cff6 | 0000cf6a |
| [17] | 008 | 005 | 000 | 0000 | 00000000 | 00000000 |
| [18] | 008 | 000 | 009 | 0000 | 000114e9 | 00011495 |
| [19] | 008 | 009 | 0000 | 010d | 000114e9 | 00011495 |
| [20] | 010 | 005 | 000 | 0000 | 00000000 | 00000000 |
| [21] | 010 | 000 | 000 | 0000 | 000159fb | 0001598f |
| [22] | 010 | 009 | 009 | 010d | 000159fb | 0001598f |
| [23] | 012 | 000 | 000 | 0000 | 00000000 | 00000000 |

| BUF | DSnuM | VDatL | TapeWP | eLPOS | trp | FSC | I-Mode | I-STS | CodeLev | Drive | Speed |
|---|---|---|---|---|---|---|---|---|---|---|---|
| [165] | 00262334 | 18ac2c | 00001023 | 00707678 | 031 | 0x | FLUSHED | IDLE | '1C15' | '0787-4863' | 4 SP4 |
| [166] | 00262335 | 18ac2c | 00001024 | 00707637 | 031 | 0x | FLUSHED | IDLE | '1C15' | '0787-4863' | 4 SP4 |
| [167] | 00262336 | 18ac2c | 00001025 | 00707596 | 031 | 0x | FLUSHED | IDLE | '1C15' | '0787-4863' | 4 SP4 |
| [168] | 00262337 | 18ac2c | 00001026 | 00707554 | 031 | 0x | FLUSHED | IDLE | '1C15' | '0787-4863' | 5 SP5 |
| [169] | 00262338 | 18ac2c | 00001027 | 00707513 | 031 | 0x | FLUSHED | IDLE | '1C15' | '0787-4863' | 5 SP5 |
| [170] | 00262339 | 18ac2c | 00001028 | 00707472 | 031 | 0x | FLUSHED | IDLE | '1C15' | '0787-4863' | 5 SP5 |
| [171] | 00262340 | 059e64 | 00001029 | 00707430 | 031 | 0x | FLUSHED | IDLE | '1C15' | '0787-4863' | 5 SP5 |
| [172] | 00262341 | 000000 | 00001030 | 00707389 | 031 | 0x | FLUSHED | IDLE | '1C15' | '0787-4863' | 5 SP5 |
| [173] | 00261401 | 18ac2c | 00000168 | 00739826 | 030 | 0x | OPEN | READ | '1C15' | '0787-4709' | 3 SP3 |
| [174] | 00261402 | 18ac2c | 00000168 | 00739839 | 030 | 0x | OPEN | READ | '1C15' | '0787-4709' | 3 SP3 |
| [175] | 00261403 | 18ac2c | 00000168 | 00739852 | 030 | 0x7060 | ERP-REC | READ | '1C15' | '0787-4709' | 3 SP3 |
| [176] | 00261404 | 18ac2c | 00000168 | 00739865 | 030 | 0x | OPEN | READ | '1C15' | '0787-4709' | 3 SP3 |
| [177] | 00261405 | 18ac2c | 00000168 | 00739877 | 030 | 0x7060 | ERP-REC | READ | '1C15' | '0787-4709' | 3 SP3 |
| [178] | 00261406 | 18ac2c | 00000168 | 00739890 | 030 | 0x | OPEN | READ | '1C15' | '0787-4709' | 3 SP3 |
| [179] | 00261407 | 18ac2c | 00000168 | 00739903 | 030 | 0x7060 | ERP-REC | READ | '1C15' | '0787-4709' | 3 SP3 |
| [180] | 00261408 | 18ac2c | 00000168 | 00739915 | 030 | 0x | OPEN | READ | '1C15' | '0787-4709' | 3 SP3 |
| [181] | 00261409 | 18ac2c | 00000168 | 00739928 | 030 | 0x7060 | ERP-REC | READ | '1C15' | '0787-4709' | 3 SP3 |
| [182] | 00261410 | 18ac2c | 00000168 | 00739941 | 030 | 0x | OPEN | READ | '1C15' | '0787-4709' | 3 SP3 |
| [183] | 00261411 | 18ac2c | 00000168 | 00739954 | 030 | 0x7060 | ERP-REC | READ | '1C15' | '0787-4709' | 3 SP3 |
| [184] | 00261412 | 18ac2c | 00000168 | 00739966 | 030 | 0x | OPEN | READ | '1C15' | '0787-4709' | 3 SP3 |
| [185] | 00261413 | 18ac2c | 00000168 | 00739979 | 030 | 0x7060 | ERP-REC | READ | '1C15' | '0787-4709' | 3 SP3 |

| BUF | DSnuM | VDatL | TapeWP | eLPOS | trp | FSC | I-Mode | I-STS | CodeLev | Drive | Speed |
|---|---|---|---|---|---|---|---|---|---|---|---|
| [186] | 00261414 | 18ac2c | 00000168 | 00739992 | 030 | 0x7060 | ERP-REC | READ | '1C15' | 0787-4709' | 3 SP3 |
| [187] | 00261415 | 18ac2c | 00000168 | 00740005 | 030 | 0x7060 | ERP-REC | READ | '1C15' | 0787-4709' | 3 SP3 |
| [188] | 00261416 | 18ac2c | 00000168 | 00740017 | 030 | 0x7060 | ERP-REC | READ | '1C15' | 0787-4709' | 3 SP3 |
| [189] | 00261417 | 18ac2c | 00000168 | 00740030 | 030 | 0x7060 | ERP-REC | READ | '1C15' | 0787-4709' | 3 SP3 |
| [190] | 00261418 | 18ac2c | 00000168 | 00740043 | 030 | 0x7060 | ERP-REC | READ | '1C15' | 0787-4709' | 3 SP3 |
| [191] | 00261419 | 18ac2c | 00000168 | 00740055 | 030 | 0x7060 | ERP-REC | READ | '1C15' | 0787-4709' | 3 SP3 |
| [192] | 00261420 | 18ac2c | 00000168 | 00740068 | 030 | 0x7060 | ERP-REC | READ | '1C15' | 0787-4709' | 3 SP3 |
| [193] | 00261421 | 18ac2c | 00000168 | 00740081 | 030 | 0x7060 | ERP-REC | READ | '1C15' | 0787-4709' | 3 SP3 |
| [194] | 00261422 | 18ac2c | 00000168 | 00740094 | 030 | 0x7060 | ERP-REC | READ | '1C15' | 0787-4709' | 3 SP3 |
| [195] | 00261423 | 18ac2c | 00000168 | 00740106 | 030 | 0x7060 | ERP-REC | READ | '1C15' | 0787-4709' | 3 SP3 |
| [196] | 00261424 | 18ac2c | 00000168 | 00740119 | 030 | 0x7060 | ERP-REC | READ | '1C15' | 0787-4709' | 3 SP3 |
| [197] | 00261425 | 18ac2c | 00000168 | 00740132 | 030 | 0x7060 | ERP-REC | READ | '1C15' | 0787-4709' | 3 SP3 |
| [198] | 00262112 | 18ac2c | 00000801 | 00740132 | 030 | 0x7060 | ERP-REC | READ | '1C15' | 0787-4200' | 2 SP2 |
| [199] | 00262113 | 18ac2c | 00000802 | 00716682 | 031 | 0x | FLUSHED | IDLE | '1C15' | 0787-4200' | 2 SP2 |
| [200] | 00262114 | 18ac2c | 00000803 | 00716641 | 031 | 0x | FLUSHED | IDLE | '1C15' | 0787-4200' | 3 SP3 |
| [201] | 00262115 | 18ac2c | 00000804 | 00716600 | 031 | 0x | FLUSHED | IDLE | '1C15' | 0787-4200' | 3 SP3 |
| [202] | 00262116 | 18ac2c | 00000805 | 00716559 | 031 | 0x | FLUSHED | IDLE | '1C15' | 0787-4200' | 3 SP3 |
| [203] | 00262117 | 18ac2c | 00000806 | 00716518 | 031 | 0x | FLUSHED | IDLE | '1C15' | 0787-4200' | 3 SP3 |
| [204] | 00262118 | 18ac2c | 00000807 | 00716477 | 031 | 0x | FLUSHED | IDLE | '1C15' | 0787-4200' | 3 SP3 |
| [205] | 00262119 | 18ac2c | 00000808 | 00716436 | 031 | 0x | FLUSHED | IDLE | '1C15' | 0787-4200' | 3 SP3 |
| [206] | 00262120 | 18ac2c | 00000809 | 00716395 | 031 | 0x | FLUSHED | IDLE | '1C15' | 0787-4863' | 3 SP3 |

READ INTERCHANGE OPTIMIZATION

BACKGROUND

The present invention relates to data storage, and more particularly, this invention relates to systems and methods for efficiently handling errors.

In customer environments with tape libraries or other access to cartridges written by a population of drives, a given cartridge may contain data written by more than one drive. Reading data written by another drive is known as read interchange. Read interchange can be problematic due to the write characteristics of another drive combined with media type and other factors. This can lead to an increase in error recovery (or error burst) in areas where interchange data is present.

Error bursts, which may include a large number of errors in a given time frame or in a given length of tape, are not easily identified since no permanent errors occur and data continues to transfer across the host/drive interface. Even if individual recovery is only transitory in nature, when it persists over long stretches of tape these error bursts can lead to host command timeouts and excessive processing times that seriously degrade performance. These bursts are often directional in nature, with reported cases of single wrap processing time in excess of 2 hours.

Error detection and control is important to any system in which data passes from one point to another. Error detection and control is particularly important in the data storage industries, as users rely on the integrity of the stored data for everything from day to day operation to long term archiving.

There is therefore a need for effective and efficient ways for reducing the occurrence of error bursts.

SUMMARY

A method according to one embodiment includes detecting an identifier of a drive that has written data to a data storage medium; performing a data transfer operation to read the data from the data storage medium; monitoring the data transfer operation for detecting temporary errors; determining whether an error burst has occurred based on the monitoring; and if an error burst has occurred, altering a condition of the data transfer operation, the alteration being selected based on the identifier of the drive that wrote the data to the data storage medium.

A method according to another embodiment includes monitoring a data transfer operation of data on a data storage medium for determining whether an error burst has occurred during the data transfer operation; if an error burst has occurred, altering a condition of the data transfer operation; monitoring the data transfer operation with the altered condition for determining a result of the altering the condition; identifying a drive that wrote the data on which the error burst occurred; and storing the result of the altering the condition in association with the identity of the drive that wrote the data on which the error burst occurred.

A system in one embodiment includes a processor and a computer-readable medium, the computer-readable medium having computer usable program code embodied therewith. The computer usable program code, when executed by the processor causes the processor to: detect an identifier of a drive that has written data to a data storage medium; perform a data transfer operation to read the data from the data storage medium; monitor the data transfer operation for detecting temporary errors; determine whether an error burst has occurred based on the monitoring; and if an error burst has occurred, alter a condition of the data transfer operation, the alteration being selected based on the identifier of the drive that wrote the data to the data storage medium.

A system in another embodiment includes a processor and a computer-readable medium, the computer-readable medium having computer usable program code embodied therewith. The computer usable program code, when executed by the processor causes the processor to: perform a data transfer operation to read data from a data storage medium; determine whether an error burst has occurred during the data transfer operation; if an error burst has occurred, alter a condition of the data transfer operation; monitor the data transfer operation with the altered condition for determining a result of the altering the condition; identify a drive that wrote the data on which the error burst occurred; and store the result of the altering the condition in association with the identity of the drive that wrote the data on which the error burst occurred.

Any of these embodiments may be implemented in a magnetic data storage system such as a tape drive system, which may include a magnetic head, a drive mechanism for passing a magnetic medium, (e.g., recording tape) over the magnetic head, and a controller (e.g., processor) electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 8A and 8B show an illustration of a log according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Note also that as used herein, the phase "based on" is intended to include situations where the dependent action or result is based at least in part on the factor following the phrase "based on". Accordingly, other factors may also be considered in any decision or computation.

The following description discloses several preferred embodiments of methods and systems for attempting to ameliorate burst errors during data transfer operations. Moreover, the following description describes methodology to detect and respond to error bursts during tape processing related to read sensitivities to data written by other drives (interchange), alone or in combination with other reasons.

To place the described embodiments in a context and for illustrative purposes only, the following description will refer to a tape-based storage system. However, it should be kept in mind that the methodology described herein can be applied to any type of system where data is written by one system and read by another.

In one general embodiment, a method includes detecting an identifier of a drive that has written data to a data storage medium; performing a data transfer operation to read the data from the data storage medium; monitoring the data transfer operation for detecting temporary errors; determining whether an error burst has occurred based on the monitoring; and if an error burst has occurred, altering a condition of the data transfer operation, the alteration being selected based on the identifier of the drive that wrote the data to the data storage medium.

In another general embodiment, a method includes monitoring a data transfer operation of data on a data storage medium for determining whether an error burst has occurred during the data transfer operation; if an error burst has occurred, altering a condition of the data transfer operation; monitoring the data transfer operation with the altered condition for determining a result of the altering the condition; identifying a drive that wrote the data on which the error burst occurred; and storing the result of the altering the condition in association with the identity of the drive that wrote the data on which the error burst occurred.

In a further general embodiment, a system includes a processor and a computer-readable medium, the computer-readable medium having computer usable program code embodied therewith, which when executed by the processor causes the processor to perform a method as presented herein.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
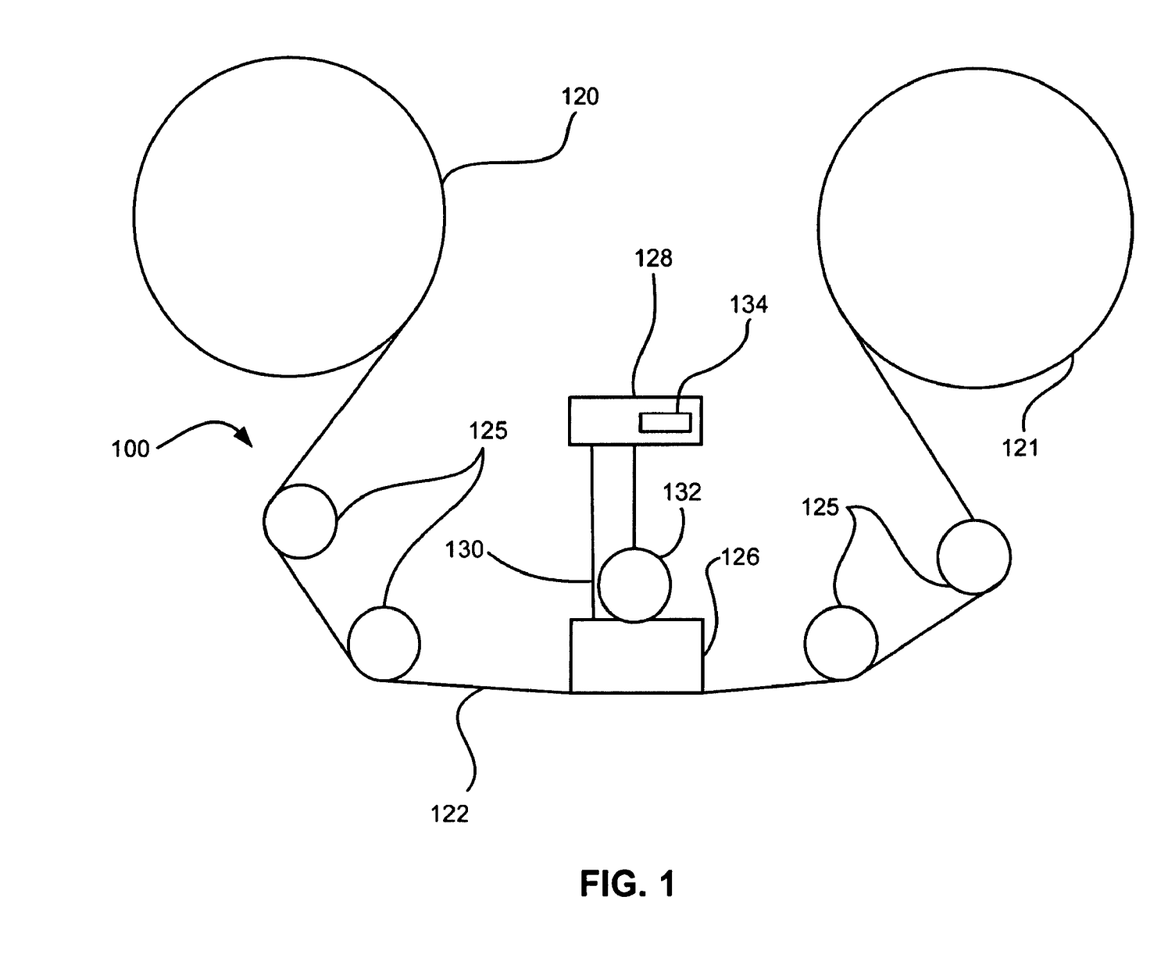
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128, e.g., processor, typically controls head functions such as servo following, writing, reading, etc. and may be in communication with a computer-readable medium 134 such as a memory. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art. Moreover, the tape drive 100 may form part of a tape library system comprising a plurality of drives.

Read burst detection typically involves interchange data, and is often directional in nature. As described in more detail below, a variety of operating mode changes can be made to reduce or eliminate the error rate in sections of tape containing interchange data. Since a given cartridge can contain data written by numerous drives, different compensation tactics may be more effective on tapes or sections of tape written by one drive than for tapes or sections thereof written by a different drive.

Accordingly, it may be useful to track successful error correction attempts by correlating a result of the attempts with an identity of the writing drive and direction as data is being processed on a given mount. In this way, specialized recovery algorithms can learn best options for reading problematic data written by a given writing drive in a given direction.

Figure 2:
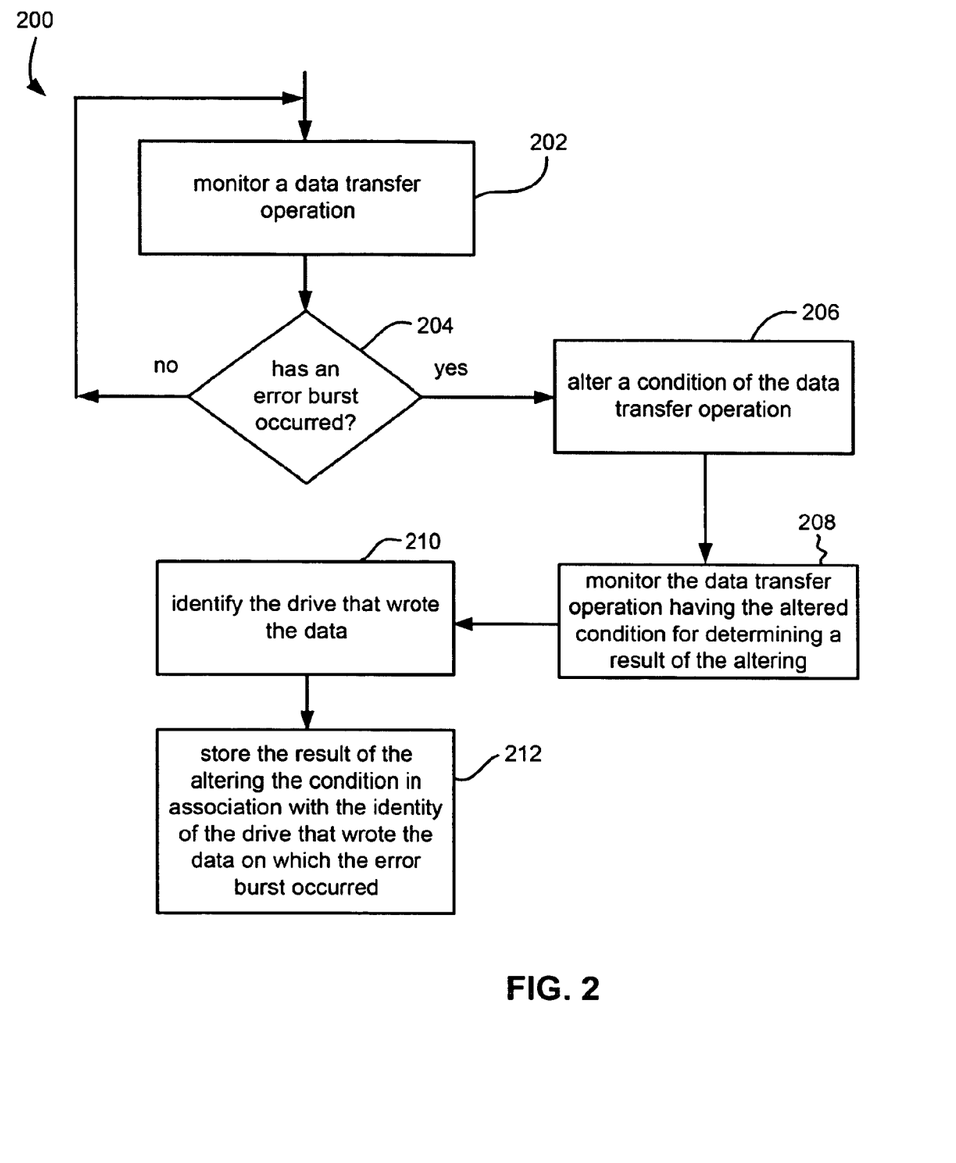
FIG. 2 is a flow diagram of a method according to one embodiment.

FIG. 2 illustrates a method 200 according to one embodiment. As an option, the present method 200 may be implemented in the context of the functionality and architecture of FIG. 1. Of course, the method 200 may be carried out in any desired environment. It should also be noted that the aforementioned definitions may apply during the present description.

With continued reference to FIG. 2, in operations 202 and 204, a data transfer operation (e.g., read or write operation) of data on a data storage medium is monitored for determining whether an error burst has occurred during the data transfer operation. In the present example, a tape-based data storage system is performing the data transfer operation, the data transfer operation being at least one of a read and a write operation. Again, this is done by way of example only, and the writing drive and/or the drive performing the data transfer operation may include any system which writes data to a data storage medium, such as a tape drive, disk drive, optical drive, etc.

The determination of whether the error burst has occurred may be based at least in part on at least one of a rate of occurrence of temporary errors and a proximity of the temporary errors relative to each other e.g., a number of temps in a given length, of tape exceeds a threshold, temps occur within a given distance along the tape of each other, etc. See the section below entitled "BURST IDENTIFICATION (TRIGGER THRESHOLDS)" for more illustrative methodology for identifying error bursts.

In operation 206, if an error burst has occurred, a condition of the data transfer operation is altered in an attempt to prevent or reduce the frequency of future error bursts. For example, one of the conditions of the data transfer operation that is changed is selected from a group consisting of channel calibration, clocking speed, and tape speed. Other conditions may also or alternatively be changed.

In operation 208, the data transfer operation having the altered condition is monitored for determining a result of the altering the condition. For example, the system may detect whether further temporary errors occurred, or that the altered condition was successful in ameliorating the errors.

In operation 210, the drive that wrote the data on which the error burst occurred is identified, e.g., by detecting an identifier of the drive as written on the data storage medium, etc. This may be done at any time, and will typically occur when the drive performing the data transfer operation reads the header of a given data set towards the beginning of the data transfer operation. The identity of the drive may correspond to its serial number, an assigned number, model number, etc., which may be written into a header (or elsewhere) of a given data set on the medium.

In operation 212, the result of the altering the condition is stored in association with the identity of the drive that wrote the data on which the error burst occurred. Moreover, because burst errors tend to also be directional, the wrap direction in effect when the error burst occurred may also be stored with the result of the altering the condition in association with the identity of the drive that wrote the data on which the error burst occurred. In one approach, the foregoing information is stored locally on the system performing the data transfer operation, e.g., in a local memory. In another approach, the foregoing information is stored remotely, e.g., on a host or on a networked data repository. The period of storage may be short, e.g., for a single wrap, or longer, e.g., until the tape is removed, until the memory is overwritten or erased, etc.

The data stored in operation 212 may be used to select the best alteration scheme for subsequent data transfer operations on data written by a particular writing drive for which results are stored. The data stored in operation 212 may thus be used to improve the efficiency of dealing with error bursts on a data storage medium having data written by multiple drives, and/or on a different tape having data written by the same drive associated with the result. For example, upon subsequently detecting an error burst, a condition of the data transfer operation may be altered based on the identity of the drive that wrote the data in which the error burst occurred and the result. If the result indicates that no further error bursts occurred during the remainder of the wrap after the conditions were altered, then, upon detecting a subsequent error burst on data written by the same drive, the conditions resulting in success may be applied. On the contrary, if the result or further monitoring indicates that the altered condition did not prevent error bursts, the unsuccessful alteration of the condition may be skipped in future operations on data written by a particular drive.

As an example of read interchange learning behavior, alternate channel clock settings applied to data written by a drive having a given serial number are assessed. With sufficient history, optimization is possible. As cartridge read continues across multiple wraps, selected alternate channel clock settings can be skipped if history shows that read data written by the particular drive has not responded to this change. Also, the "best-options" learned for each interchange drive may be applied first in order to prevent error bursts faster. Accordingly, a last successful altered condition applied during a previous data transfer operation on data written by the same drive is preferably applied to the subsequent data transfer operation upon determining that an error burst has occurred during the data transfer operation Successful settings may remain in effect until wrap turn, until a subsequent error burst, etc.

The ability to identify a read interchange error burst by writing drive serial number and respond according to a history of "best-options" learned on the current mount improves drive performance by reducing or eliminating the temporary error rate. Also, interchange statistics are logged internally for the purpose of failure analysis and as feedback for future optimization changes.

Figure 3:
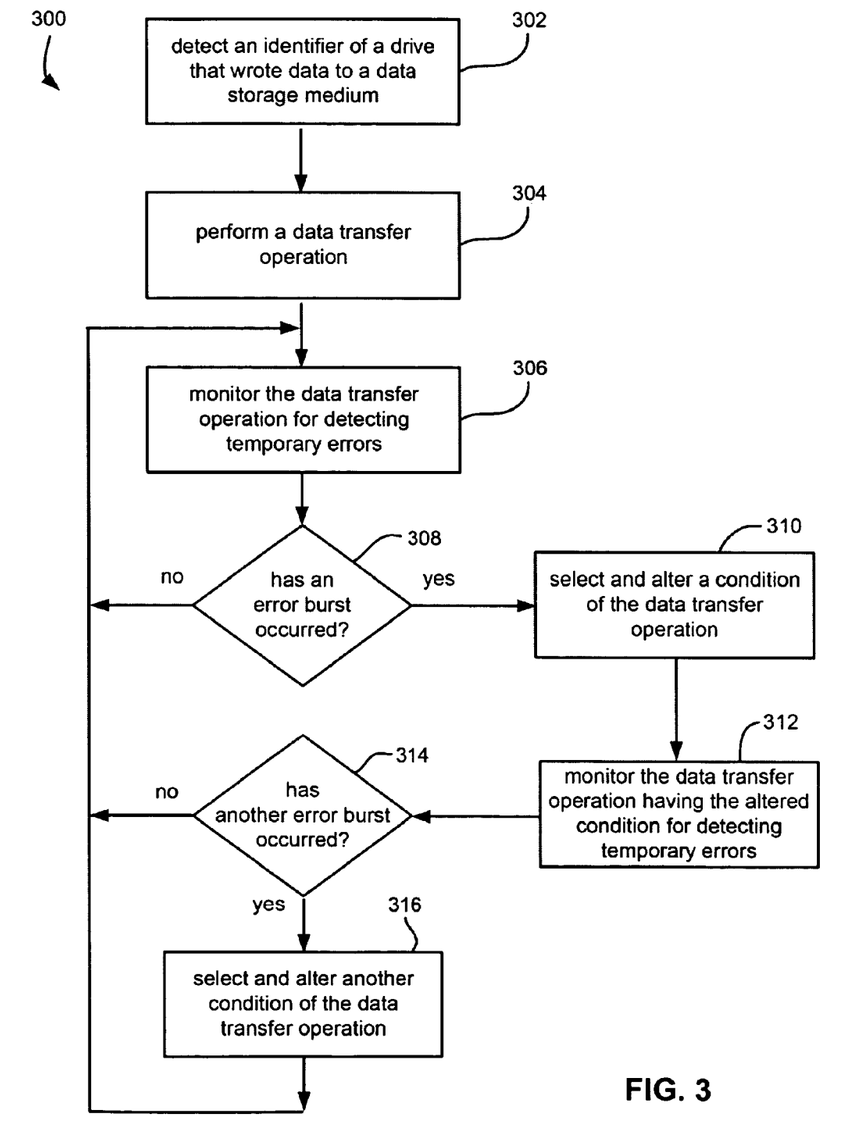
FIG. 3 is a flow diagram of a method according to another embodiment.

FIG. 3 illustrates a method 300 according to one embodiment. As an option, the present method 300 may be implemented in the context of the functionality and architecture of FIGS. 1 and 2. Of course, the method 300 may be carried out in any desired environment. It should also be noted that the aforementioned definitions may apply during tire present description.

In operation 302, an identifier of a drive that has written data, to a data storage medium is detected. Such drive is referred to herein as the "writing drive." Where multiple drives have written data to a given medium, the identities of the various drives may be identified. Again, in one approach, the writing drive adds its serial number to a data header preceding data written by the drive. During readback, the reading drive reads the header and extracts the serial number.

In operation 304, a data transfer operation is performed to read the data from the data storage medium.

In operation 306, the data transfer operation is monitored for detecting temporary errors.

In operation 308, a determination is made as to whether an error burst has occurred based on the monitoring. The determination constraints and parameters may be the same or similar to those used in operation 204 of FIG. 2. Alternatively, they may be different, as exemplified below in the section entitled "BURST IDENTIFICATION (TRIGGER THRESHOLDS)."

With continued reference to FIG. 3, in operation 310, if an error burst has occurred, a condition of the data transfer operation is altered, the alteration being selected based on the identifier of the drive that wrote the data to the data storage medium.

In optional operation 312, the data transfer operation having the altered condition may be monitored for defecting temporary errors.

In optional operation 314, a determination may be made as to whether another error burst has occurred based on the monitoring of the data transfer operation having the altered condition. The determination constraints and parameters may be the same or similar to those used in operation 308. Alternatively, they may be different, as exemplified below in the section entitled "BURST IDENTIFICATION (TRIGGER THRESHOLDS)."

If another error burst is discovered, then it is likely that the prior alteration of conditions did not effectively ameliorate the cause of the errors, and so another corrective action is tried. Accordingly, in optional operation 316, if another error burst has occurred, another condition of the data transfer operation is altered. This may include altering one or more previously altered conditions, altering conditions previously unaltered, etc. Moreover, previously altered conditions may remain altered, may revert to a default setting, etc. Preferably, this later alteration is also selected based on the identity of the writing drive.

Preferably, the alterations of the conditions in both tape wrap directions are applied sequentially according to a predefined sequence, which may be stored in a table, list, etc. The sequence may be reset when a tape wrap direction is reversed and/or when data written by a different drive is detected. Once sequential progress through the option table for a given direction and mode (e.g., read vs. write) is started, then the sequence may or may not reset at the beginning of the next wrap in that same direction, mode and writing drive. For example, it may resume at the last option tried for that direction, mode and writing drive, and continue to iterate through the list. Accordingly, while the same general sequence may be used for each writing drive and/or tape wrap direction, the sequence applied in each tape wrap direction may be independently controlled. See the section below entitled "OPTION TABLE" for an example of a sequence.

In one illustrative mode of operation, when an error burst is detected, then a change in channel calibration, clocking speeds and/or tape speed is imposed. These options may be defined and sequenced in a microcode table organized by mode (read vs. write), direction (forward vs. backward), and drive type. The table is an iterative table, hence the name rolling calibration table. If the error burst persists, then the next option in the table is applied until the error burst dissipates or until wrapturn. A subsequent burst that occurs in another wrap of the same direction and on data written by the same drive may restart table options at the last sequence tried.

In particularly preferred embodiments, for a subsequent data transfer operation in a given wrap direction, a last successful altered condition applied during a previous data transfer operation on data written by the same drive, and optionally in the same wrap direction, is applied to the subsequent data transfer operation upon determining that an error burst has occurred during the subsequent data transfer operation. For example, error burst handling may "learn" directionally ranch as it may learn writing drives. As data processing continues over multiple wraps, the error burst response may apply the last-best option for that direction and/or writing drive based on error burst history for the mount. For example, a forward wrap error burst may start applying options at the last applied forward offset in the rolling calibration table, rather than restarting from the beginning. Accordingly, a previously-successful condition alteration that resolved a problematic burst may be applied as the first option if a subsequent error burst occurs in a same tape wrap direction and mode on a different wrap.

Figure 4:
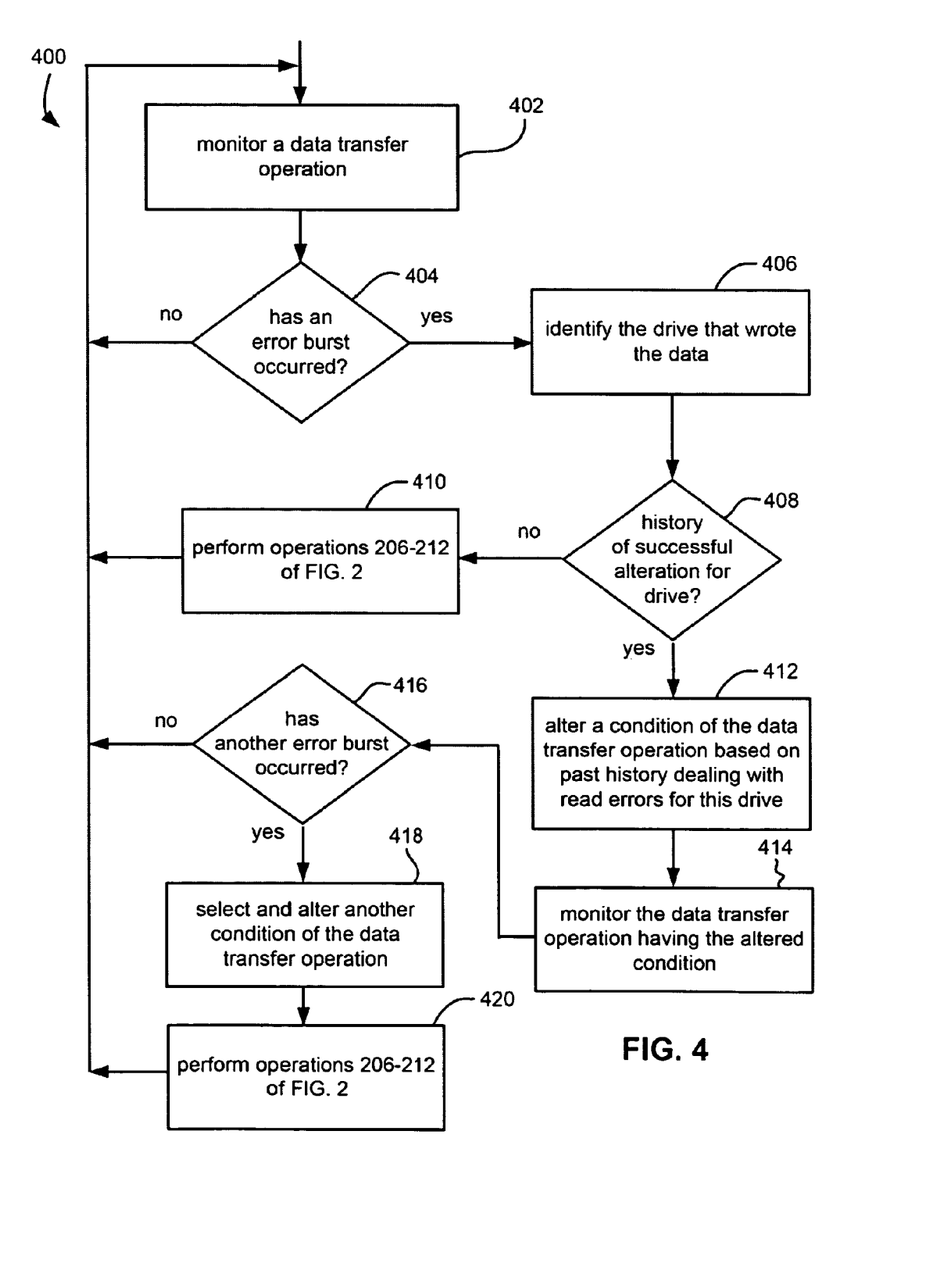
FIG. 4 is a flow diagram of a method according to another embodiment.

FIG. 4 illustrates a method 400 according to yet another embodiment. As an option, the present method 400 may be implemented in the context of the functionality and architecture of FIGS. 1-3. Of course, the method 400 may be carried out in any desired environment. It should also be noted that the aforementioned definitions may apply during the present description.

With continued reference to FIG. 4, in operations 402 and 404, a data transfer operation (e.g., read or write operation) of data on a data storage medium is monitored for determining whether an error burst has occurred during the data transfer operation.

In operation 406, if an error burst, has occurred, a identity of the drive that wrote the data is determined.

In operation 408, a determination is made as to whether there is a history of one or more successful drive alterations. If not, further operations 412 may be performed, such as operations 202-216 of the method of FIG. 2. If a history of one or more successful drive alterations is found, a condition of the data transfer operation is altered based on the past history of dealing with read errors for data written by the particular drive. See operation 412 of FIG. 4.

In operation 414, the data transfer operation having the altered condition is monitored. For example, the system may detect whether further temporary errors occurred, or that the altered condition was successful in ameliorating the errors for this drive.

In optional operation 416, a determination may be made as to whether another error burst has occurred based on the monitoring of the data transfer operation having the altered condition.

If another error burst is discovered, then it is likely that the prior alteration of conditions did not effectively ameliorate the cause of the errors, and so another corrective action is tried. Accordingly, in optional operation 418, if another error burst has occurred, another condition of the data transfer operation is altered.

Further operations 420 may be performed, such as operations 206-216 of the method of FIG. 2.

Option Table

Figure 5:
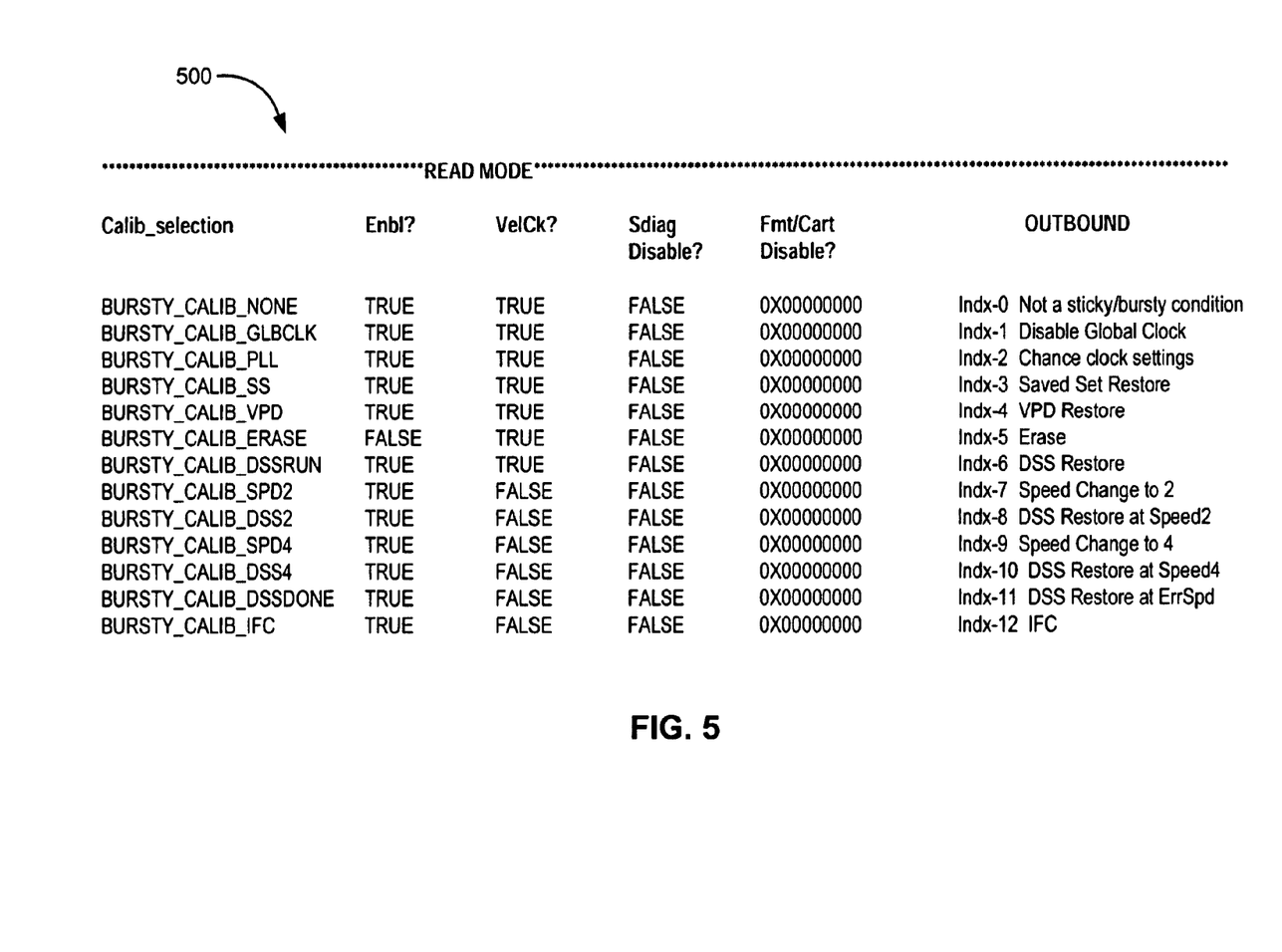
FIG. 5 is an illustration of an example of the forward direction (outbound) rolling calibration table for a read mode for an illustrative type of tape drive.
Figure 6:
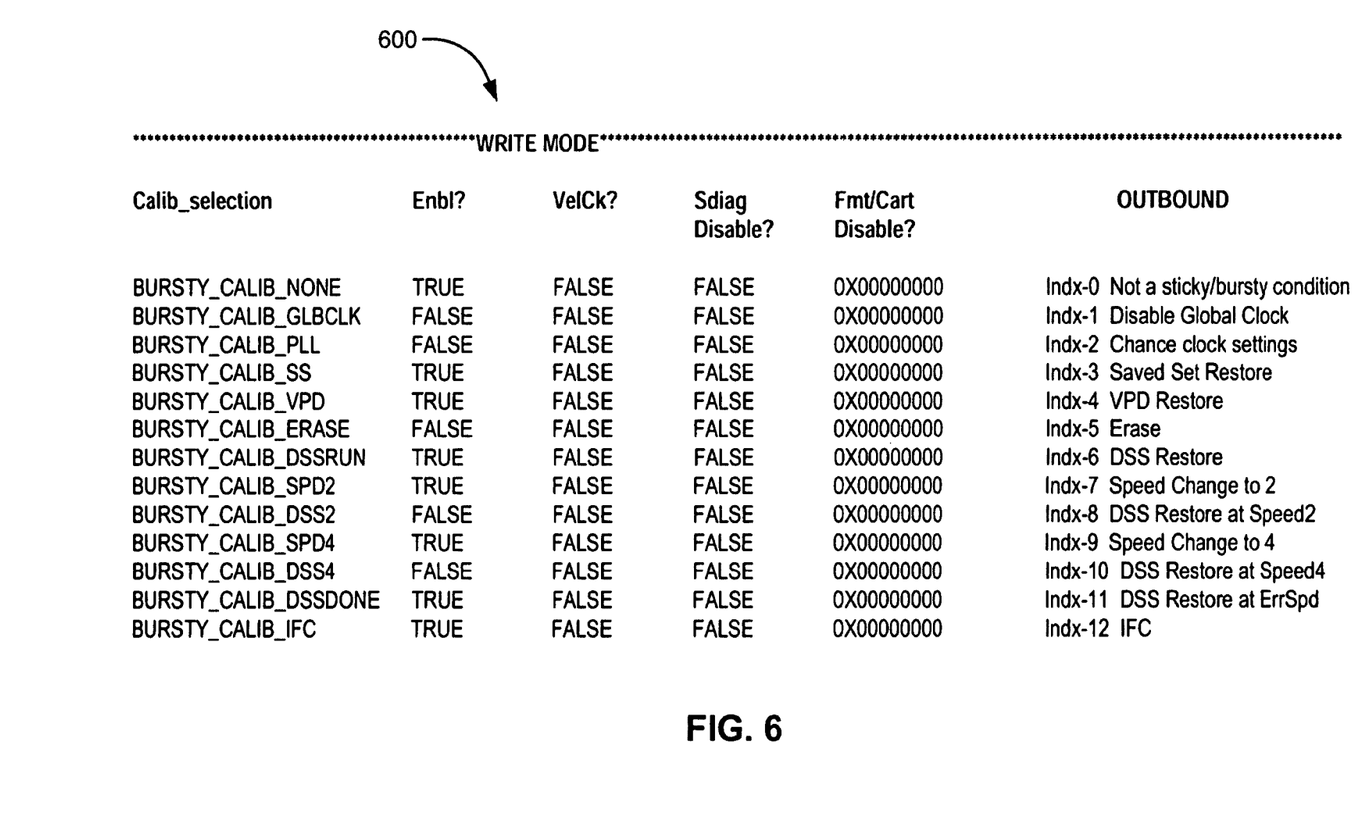
FIG. 6 is an illustration of an example of the forward direction (outbound) rolling calibration table for a write mode for the illustrative type of tape drive.

FIG. 5 shows an example of the forward direction (outbound) rolling calibration table 500 for a read mode for an illustrative type of tape drive. FIG. 6 shows an example of the forward direction (outbound) rolling calibration table 600 for a write mode for the illustrative type of tape drive. Note that such tables may be populated with different options and different sequences for each drive type and/or mode. Note also that these figures show both write and read sharing the same set of options as defined in the first column of each table. However, the value in the second column (Enbl?) determines whether it is a valid option for that mode. It is possible to disable rolling calibration options externally via the host Send Diagnostic command. If this is done, then the appropriate row of the 'SDiag Disable?' column is set to TRUE and the option is then blocked regardless of the value in the 'Enbl?' column. The 'VelCk?' column allows/prohibits the checking of speed-limitation logic as well as rolling calibration logic. The 'Fmt/Cart Disable?' column is for dynamic limitations of calibration options based on loaded cartridge type and/or data format. The "OUTBOUND" column indicates the condition that is altered. Other columns may be included, e.g., for dynamic bookkeeping of dataset numbers related to burst triggers.

A separate table and pointer are preferably maintained for write vs. read, and forward vs. backward for each. Sequencing begins at Index=0 through Index=12 and then wraps back to the top for another iteration.

On multiple passes through a given table, certain options can be skipped based on past performance. For example, a previously-attempted option that was ineffective or made conditions worse for a given writing drive can be skipped.

Also, a pass limitation can be applied for a given wrap on the assumption that rolling calibration is having no effect on the error rate.

Redundant Options

Some calibration table options may be actions that nominal error recovery methods, e.g., those taken by the drive, can also take. Accordingly, it may be desirable for rolling calibration logic to avoid repeating the redundant actions. In one approach, if an error recovery procedure has been attempted to correct one of the temporary errors on data written by a particular drive and was ineffective, then a condition that is about the same as a condition imposed by the error recovery procedure in the previous attempt is not used during a subsequent alteration of conditions of the data transfer operation on data written by the same drive.

In preferred approaches, some actions may be included in the rolling calibration table in order to manage error bursts made up of short-duration error recovery sessions. The nature of this kind of error burst is that the nominal error recovery sessions never require enough retry to attempt a calibration change. So, without an adjustment to channel calibration repetitive temps continue to occur until burst detection logic triggers to make that optimization. Note that burst detection logic may also monitor actions taken by nominal error recovery between burst triggers and on the current wrap half. This is an efficiency step done to skip one or more rolling calibration options if nominal recovery has already used them without success. Some redundancy may also be assessed on a wrap-basis.

In one approach, the foregoing operations may be applied only when data written by the same drive is applied, and the system is reset to a default if no history of the writing drive is available. In another approach, the foregoing operations may be applied regardless of the drive that wrote the data currently being processed.

Burst Identification (Trigger Thresholds)

There may be numerous triggers involved in burst detection that are related to the host command, to the background temporary error rate, and to the sequencing rate down the rolling calibration table once an error burst is detected. Three formal triggers are defined, though others may be used in addition to these or alternatively thereto. All triggers may reset on load, wrapturn, on reposition and/or upon detecting data written by a different writing drive.

Default Trigger Threshold

Upon reaching a predetermined number of temps, an error burst may be called. Again, a temporal and/or spatial limitation may also be applied in determining whether an error burst has occurred.

In one illustrative embodiment, used in the following example, assume that 12 temporary errors on a given wrap must occur before a burst can be identified. This is the default trigger.

Decelerated Trigger Threshold

At any given time, the burst trigger threshold may be set to either the default or accelerated value. If a burst trigger has tripped, but more than 200 datasets have been processed since the last trigger (or if no trigger, 200 datasets from the first temp on the current wrap), then the burst trigger may be ignored. The temp error counters are reset and burst detection is deferred to the next trigger. If this wrap has already experienced an error burst, then the rolling calibration that was selected stays in effect and is not changed.

Accelerated Trigger Threshold

In some approaches, an accelerated threshold may be used in the determination of whether another error burst has occurred, the accelerated threshold having less temporary errors than a threshold used in the first determining operation. Continuing with the illustrative example, assume under the accelerated threshold, 6 temporary errors on a given wrap must occur before a burst can be identified. The accelerated trigger is enabled by one or more of the following conditions. It is disabled (default trigger restored) when more than 100 datasets have been processed since the last trigger.

- Clusters: the last burst trigger and the current burst trigger each spanned <50 datasets
- Dynamic: an error burst has been detected and a rolling calibration applied, but after 6 temps less than 25 datasets have been read. Since a rolling calibration option could be ineffective or potentially make the error burst worse, this accelerated trigger allows for rapid sequencing to the next rolling calibration option.
- Time: if an error burst condition exists and read/write processing on this wrap has exceeded 20 minutes but is not due to a slow host (>25% of this time must have been involved in error recovery)
- Positioning Read: Space or locate is in progress. The host command timeouts are shorter than for read/write, so burst detection is made more sensitive
- Forced Speed Change: A section of the rolling calibration table is involved in imposing various speed changes. Since these could aggravate the temp rate, burst detection is forced to use an accelerated trigger
- Write Sync/Flush: Host command timeouts are shorter so burst detection is made more sensitive.

Excessive Recovery

Preferably, an error code is generated if the data transfer operation in a single wrap exceeds a predefined time limit. More preferably, an error code that terminates further processing is generated if the data transfer operation in a single wrap exceeds a predefined time limit and a predefined portion of the time limit is spent in error recovery on that wrap. For example, in cases of read/write error bursts on a given wrap which are not responsive to rolling calibration changes, excessive recovery may be terminated by forcing a permanent error with a unique fsc. The drive/cartridge can then be pulled for failure analysis and feedback for possible improvement to burst management algorithms. On detection of a burst condition, if the time-in-wrap has exceeded some predefined time limit, e.g., 40 minutes, then a perm error may be forced. To compensate for slower systems, the time involved in error recovery may be considered. For example, the aforementioned perm error may be forced only if >25% of that time is involved in error recovery. When near end-of-wrap (EOW), the excessive recovery timeout may be deferred to allow host processing to continue. This may be done because error bursts are often directional in nature, so that on wrapturn nominal R/W performance typically resumes. The determination of "near-EOW" varies depending on such things as capacity scaling where the full wrap length is not used.

External Notification

Various error codes, reports, etc. may be output to report burst triggers, changes made in reaction to a burst, etc. These error codes may be informational and preferably do not terminate host processing to the mounted cartridge.

As mentioned, error bursts that seriously degrade drive performance can easily go unnoticed when permanent errors don't occur. In order to post notification of these events to the attached host system, error messages such as unique fsc's may be logged as informational errors during burst processing. The Request Sense data may also summarize burst action taken. Further, a message such as a code, burst log, etc. may be output to indicate a number of error bursts determined to have occurred. Moreover, a message such as a code, burst log, etc. may be output to indicate a result of the altering the condition.

Any permanent errors forced by burst management may also have unique fsc's. These help to identify problem drives and/or tape volumes as well as to facilitate the collection of drive dumps for failure analysis.

Burst Log

Figure 7:
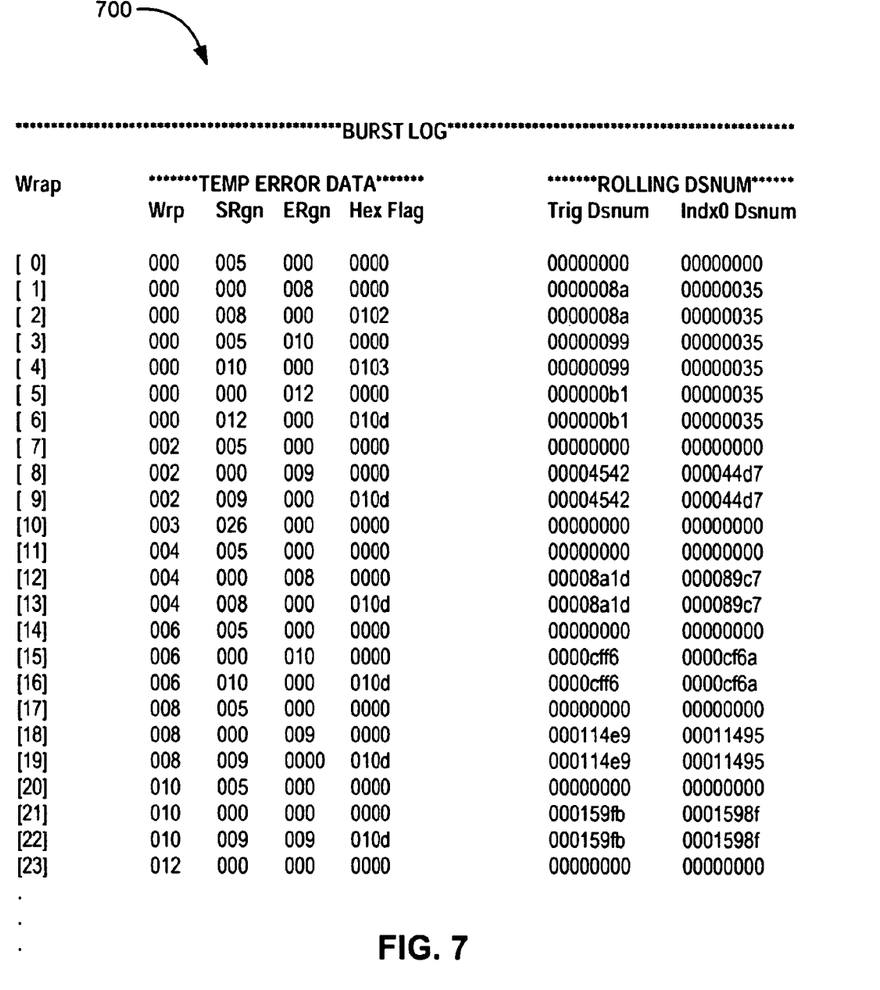
FIG. 7 is an illustration of a burst log according to one embodiment.

As an example of error burst data maintained in the dump file, FIG. 7 has an edited version of a burst log 700 which summarizes rolling calibration reaction to a systematic write error burst. Columns shown include those indicating the problem wrap ('Wrp') and specific action taken ('Hex Flag'). Values in the "Hex Flag" column not having all 0 values represent error burst triggers. The first character of the 'Hex Flag' column in these trigger rows represents the number of iterations through the option table and the second represents the detailed calibration action. Relative position on the wrap is identified by a region value which ranges from 1 (beginning of tape) to 127 (end of tape). Two region columns exist to indicate start/end of a burst trigger interval ("SRgn" and "ERgn"). Note that, in this illustrative dump, most of the initial write bursts occur on even (forward direction) wraps near the beginning of the tape.

Learning is demonstrated on wrap 0 where three options were applied prior to resolving the error burst. According to the log, on wrap 0 the first temp occurred at dataset 0x35 ("Indx0 dsnum") with write burst triggers ("Trig Dsnum") at datasets 0x8A (option 2 applied as indicated by final bit in "Hex Flag" column), 0x99 (option 3 applied) and 0xB1 (option d applied).

Option d cleared the error burst until wrap turn, so on this wrap the error burst spanned a total of 125 datasets (0xB1-0x35). The log shows similar error bursts occurring in about the same location on all subsequent even wraps (forward direction). Rolling calibration started with the last successful forward wrap option, which was option d. This proved successful in all cases, which shortened the burst resolution period on later wraps (spanned between 6 to 110 datasets, with an estimated reduction of 2 minutes forward wrap processing time).

FIGS. 8A and 8B depict a log 800 showing read performance across interchange data. The log is organized by buffer segment (BUF) and shows information about datasets read from tape. The left section of the diagram indicates dataset number (DSnum), size, tape location (eLPOS) and other attributes (VDatL, TapeWP, trp) of data just read. The middle section indicates error history, with fsc's that accompanied temporary or permanent errors listed in the I-Mode column (ERP-REC means ERP-recovered or temp error). The right section indicates information about the drive that actually wrote the data, including code level (CodeLev), drive identifier or serial number (Drive), and speed at which the data was written (Speed)). The diagram shows an error burst while reading data that drive '07874709' wrote. There were no problems reading data from drives '07874863' or '07874200' that were written at various speeds.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
  detecting an identifier of a drive that has written data to a data storage medium;
  performing a data transfer operation to read the data from the data storage medium;
  monitoring the data transfer operation for detecting temporary errors;
  determining whether an error burst has occurred based on the monitoring; and
  if-an error burst has occurred, altering a condition of the data transfer operation, the alteration being selected based on the identifier of the drive that wrote the data to the data storage medium.

2. The method as recited in claim 1, wherein a last successful altered condition applied during a previous data transfer operation on data written by the same drive is applied to the subsequent data transfer operation upon determining that an error burst has occurred during the data transfer operation.

3. The method as recited in claim 1, further comprising detecting identifiers of multiple drives that have written data to the data storage medium, wherein the alteration is selected based on the identifier of the drive that wrote the data in which the error burst occurred.

4. The method as recited in claim 1, further comprising monitoring the data transfer operation having the altered condition for detecting temporary errors; determining whether another error burst has occurred based on the monitoring of the data transfer operation having the altered condition; and if another error burst has occurred, altering another condition of the data transfer operation, the alteration of the another condition being selected based on the identifier of the drive that wrote the data to the data storage medium.

5. The method as recited in claim 1, wherein the alterations of the conditions are applied sequentially according to a predefined sequence.

6. The method as recited in claim 5, wherein for a subsequent data transfer operation, a last unsuccessful altered condition applied during a previous data transfer operation on data written by the same drive is not applied to the subsequent data transfer operation upon determining that an error burst has occurred during the subsequent data transfer operation.

7. The method as recited in claim 6, wherein for a subsequent data transfer operation in a given wrap direction, a last successful altered condition applied during a previous data transfer operation in the same wrap direction is applied to the subsequent data transfer operation upon determining that an error burst has occurred during the subsequent data transfer operation.

8. The method as recited in claim 1, wherein one of the conditions of the data transfer operation that is changed is selected from a group consisting of channel calibration, clocking speed, and tape speed.

9. The method as recited in claim 1, wherein the data storage medium is a tape, wherein the alterations of the conditions in both tape wrap directions are applied sequentially according to predefined sequences, wherein the sequence applied in each tape wrap direction is independently controlled.

10. The method as recited in claim 1, wherein if an error recovery procedure has been previously attempted to correct a temporary error of an error burst on data written by the drive and was ineffective, a condition that is about the same as a condition imposed by the error recovery procedure in the previous attempt is not used during a subsequent alteration of conditions of the data transfer operation on data written by the same drive.

11. The method as recited in claim 1, further comprising storing a result of the altering the condition and associating the result with the drive that wrote the data.

12. A method, comprising:
  monitoring a data transfer operation of data on a data storage medium for determining whether an error burst has occurred during the data transfer operation;
  if an error burst has occurred, altering a condition of the data transfer operation;
  monitoring the data transfer operation with the altered condition for determining a result of the altering the condition;
  identifying a drive that wrote the data on which the error burst occurred; and
  storing the result of the altering the condition in association with the identity of the drive that wrote the data on which the error burst occurred.

13. The method as recited in claim 12, further comprising subsequently detecting an error burst, and altering a condition of the data transfer operation based on the identity of the drive that wrote the data in which the error burst occurred and the result.

14. The method as recited in claim 12, further comprising storing a wrap direction with the result of the altering the condition in association with the identity of the drive that wrote the data on which the error burst occurred.

15. The method as recited in claim 12, wherein a last successful altered condition applied during a previous data transfer operation on data written by the same drive is applied to the subsequent data transfer operation upon determining that an error burst has occurred during the data transfer operation.

16. A system, comprising:
  a computer-readable storage medium, the computer-readable storage medium having computer usable program code embodied therewith, which when executed by the processor causes the processor to:
    detect an identifier of a drive that has written data to a data storage medium;
    perform a data transfer operation to read the data from the data storage medium;
    monitor the data transfer operation for detecting temporary errors;
    determine whether an error burst has occurred based on the monitoring; and
    if an error burst has occurred, alter a condition of the data transfer operation, the alteration being selected based on the identifier of the drive that wrote the data to the data storage medium.

17. The system as recited in claim 16, further comprising:
  a processor;
  a magnetic head in communication with the processor; and
  a drive mechanism for passing a magnetic recording tape over the head.

18. The system as recited in claim 16, wherein the data transfer operation is a read operation from a magnetic recording tape.

19. A system, comprising:
- a computer-readable storage medium, the computer-readable storage medium having computer usable program code embodied therewith, which when executed by the processor causes the processor to:
    - perform a data transfer operation to read data from a data storage medium;
    - determine whether an error burst has occurred during the data transfer operation;
    - if an error burst has occurred, alter a condition of the data transfer operation;
    - monitor the data transfer operation with the altered condition for determining a result of the altering the condition;
    - identify a drive that wrote the data on which the error burst occurred; and
    - store the result of the altering the condition in association with the identity of the drive that wrote the data on which the error burst occurred.

20. The system as recited in claim 19, further comprising:
- a processor;
- a magnetic head in communication with the processor; and
- a drive mechanism for passing a magnetic recording tape over the head.

\* \* \* \* \*